United States Patent [19]

Amdall et al.

[11] 3,995,513
[45] Dec. 7, 1976

[54] DRIVE LINE VIBRATION ABSORBER

[75] Inventors: John K. Amdall; William O. Jankovsky, both of Peoria, Ill.

[73] Assignee: Caterpillar Tractor Co., Peoria, Ill.

[22] Filed: Mar. 3, 1975

[21] Appl. No.: 555,004

[52] U.S. Cl. .................................. 74/574; 64/1 V; 64/11 R; 64/29 NM
[51] Int. Cl.² .......................................... F16F 15/10
[58] Field of Search ............ 64/1 V, 1 R, 15, 11 R, 64/27 NM; 74/574

[56] References Cited
UNITED STATES PATENTS

| | | | |
|---|---|---|---|
| 1,939,855 | 12/1933 | Kreis | 74/574 |
| 2,049,133 | 7/1936 | Peirce | 74/574 |
| 2,380,770 | 7/1945 | McFarland | 74/574 |
| 2,585,382 | 2/1952 | Guernsey | 74/574 |
| 3,165,945 | 1/1965 | Magrum | 74/574 |
| 3,234,817 | 2/1966 | Williamson | 74/574 |

Primary Examiner—Samuel Scott
Assistant Examiner—Randall Heald
Attorney, Agent, or Firm—Charles E. Lanchantin, Jr.

[57] ABSTRACT

A drive line vibration absorber, for a mass elastic system having an engine operatively connected to a gear train through an elongated drive shaft, includes an inertia mass disposed in parallel relation to such mass elastic system and a resilient ring secured to the mass elastic system in axially driving cooperation with the inertia mass and permitting limited torsional movement thereof for effectively reducing the amplitude of the relatively low natural frequency torsional vibrations of the mass elastic system.

11 Claims, 5 Drawing Figures

3,995,513

DRIVE LINE VIBRATION ABSORBER

BACKGROUND OF THE INVENTION

It is well known that various vehicle noise and drive line failure problems are directly traceable to torsional excitations from the engine. For example, the drive line of a typical wheel hauling unit includes an engine, a drive shaft, a transmission, a differential and final drive gear arrangement, and driven wheels arranged in series. Such vehicle drive lines frequently exhibit conditions of resonance corresponding to a certain engine speed, wherein the torsionally irregular impulses from the engine have a frequency generally corresponding to the natural frequency of the mass elastic system. These resonant conditions have resulted in not only vexatious vehicle vibration and noise problems, but also in drive line failures after extended service of the vehicle.

A number of methods of vibration control have been commercially developed to reduce the severity of these engine excitation problems. One relatively common solution is to incorporate an elastomeric flexible coupling in series with the drive line for lowering the natural frequency of the system, and for otherwise absorbing engine torsional vibrations. While these flexible couplings to absorb some shock and can desirably accommodate shaft misalignment, they are not totally effective and are susceptible to fatigue failure. Such failures occur because the coupling must transmit full drive line torque and must be responsive to a relatively broad range of operating frequency.

More specifically, when the torsional natural frequency of the engine, transmission, and intermediate drive shaft is below approximately 30 hertz or particularly in the range of 9 to 13 hertz (cycles per second), the normally acceptable flexible coupling and vibration absorber solutions become entirely inadequate. Viscous engine dampers of the type shown in U.S. Pat. No. 3,234,817 issued Feb. 15, 1966 to S. O. Williamson and assigned to the assignee of the present invention are frequently used to reduce the peak amplitudes of torsional vibrations. While these viscous dampers have been found extremely satisfactory at relatively high natural frequency ranges, for example, from 140 to 220 hertz, they are generally unacceptable for solving relatively low frequency torsional drive line problems due to lack of sufficient relative velocity between the elements thereof which is a mandatory requirement for effective viscous damping.

Another apparent solution would appear to be use of a conventional engine vibration absorber of the type having an inertia mass radially outwardly secured to the engine crankshaft or the like through an intermediate elastomeric ring. Representative of this type of absorber is U.S. Pat. No. 3,314,304 issued Apr. 18, 1967 to R. H. Katzenberger which further discloses multiple inertia elements elastically connected in series. These radial arrangements are also unsatisfactory for solving low frequency drive line vibration problems because they cannot be made torsionally soft enough while simultaneously maintaining sufficient radial and axial stability of one or more of the inertia masses.

It should be appreciated also, that any vibration absorber that would solve the aforementioned relatively low natural frequency of vibration problems should also be economical in construction, easily adaptable and serviceable with respect to the vehicle drive line, and be capable of association with other vibration absorbers such as the viscous engine damper without an adverse affect thereon.

SUMMARY AND OBJECTS OF THE INVENTION

Therefore, to overcome the above-noted problems, it is an object of the present invention to provide an improved vibration absorber for effectively reducing drive line torsional vibrations associated with a mass elastic system having a relatively low natural frequency.

Another object of this invention is to provide such a vibration absorber having a relatively simple and economical construction.

Another object of the invention is to provide a vibration absorber of the character described which may be relatively easily serviced.

Other objects and advantages of the present invention will become more readily apparent upon reference to the accompanying drawings and following description.

DESCRIPTION OF THE PREFERRED EMBODIMENT

Figure 1:
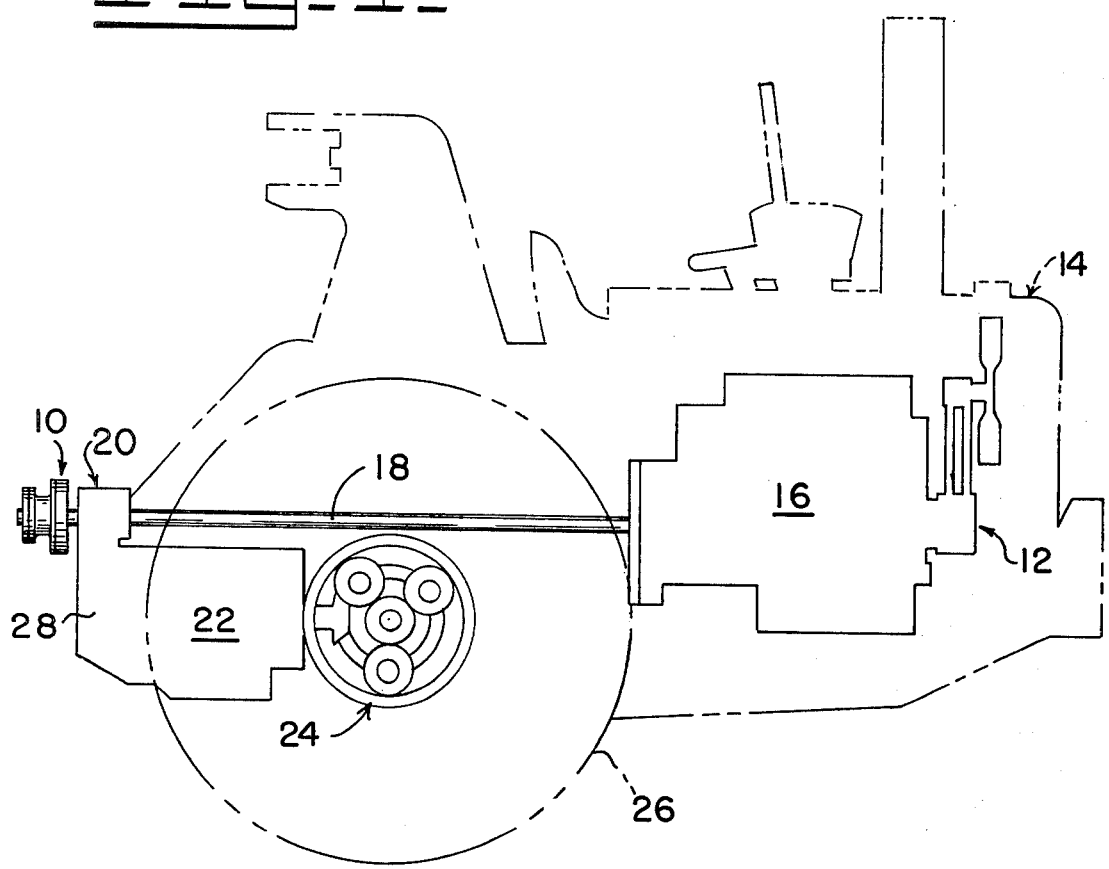
FIG. 1 is a side elevational view of a vehicle drive line including the drive line vibration absorber of the present invention, with a fragmentary portion of a vehicle shown in phantom for illustrative convenience.
Figure 2:
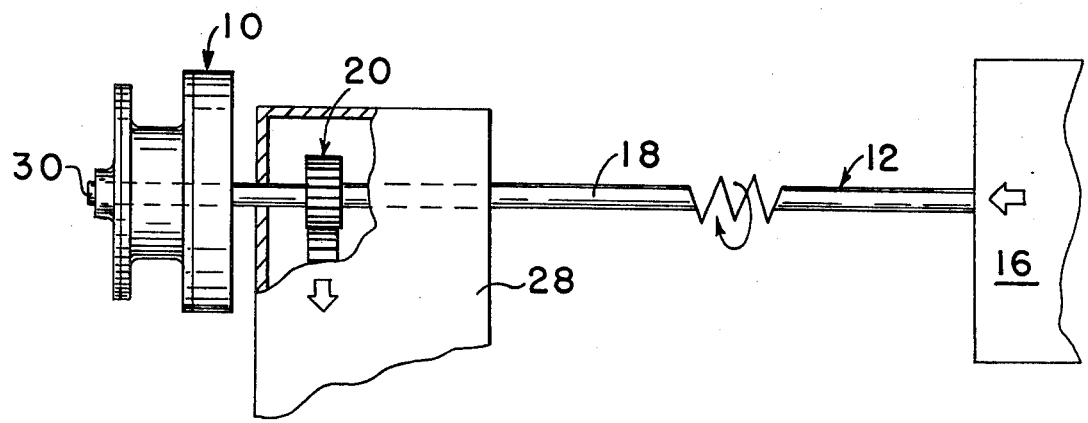
FIG. 2 is an enlarged, schematically illustrated side elevational view of a portion of the vehicle drive line of FIG. 1 showing an engine, an elongated drive shaft, and a transmission arranged in series, and with the drive line vibration absorber of the present invention disposed in parallel with the mass elastic system at a distal end of the drive shaft.

With reference to FIGS. 1 and 2 of the drawings, the drive line vibration absorber 10 of the present invention is shown in operative cooperation with a mass elastic system or drive line 12 of a relatively large, material hauling vehicle 14. The vehicle, which may be a wheel tractor unit as shown in phantom outline, is driven by a six-cylinder diesel engine 16 at the forward end thereof. Torsional excitations of a third order from the engine result in cyclically high torsional loading of a relatively flexible, elongated drive shaft 18 leading rearwardly therefrom. The drive line further includes a transfer gear train 20 operatively associated with the drive shaft for delivering power to a vehicle transmission 22. From the transmission, power is communicated through a differential and final drive arrangement 24 to a pair of transversely opposite wheels 26. Thus, it is evident that power is directed to the vehicle wheels by way of the elongated drive shaft, which extends completely through a transmission housing 28 to provide a rearward extremity or a distal end 30 outwardly thereof. The drive line vibration absober of the present invention is conveniently removably mounted on this distal end of the shaft.

Figure 3:
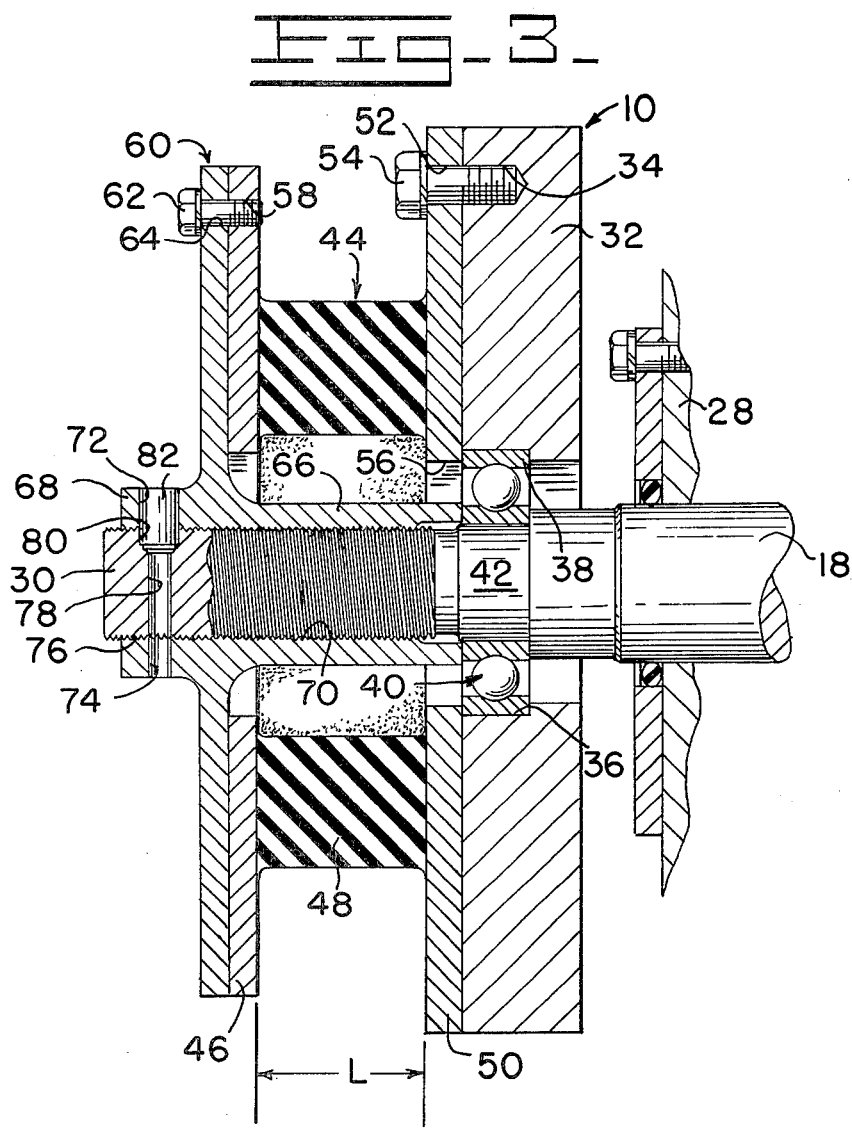
FIG. 3 is a substantially enlarged central vertical section view of the drive line vibration absorber of FIG. 2.

As best shown in FIG. 3, the drive line vibration absorber 10 of the present invention includes an annular weight 32 encirclingly disposed about the distal end 30 of the elongated drive shaft 18. The weight has a plurality of rearwardly facing, axially oriented, peripheral threaded bores 34 therein, as well as a rearwardly facing counterbore 36 centrally thereof which is adapted to receive an outer race 38 of a roller bearing 40. This roller bearing is mounted on a stepped portion 42 of the shaft so that the weight is both freely rotatably supported and axially positioned thereon.

The drive line vibration absorber 10 further includes a resilient ring arrangement 44 which is disposed in axially driving cooperation with the annular weight 32. As is apparent from FIG. 3, the resilient ring arrangement is of sandwich construction including a series arranged rear plate 46, an elastomeric ring 48, and a front plate 50. The elastomeric ring is preferably a relatively soft, styrene butadiene rubber ring which is suitably bonded to the plates. Styrene butadiene rubber beneficially has better heat resistance and greater damping capability when compared to natural rubber, which could, nevertheless, be utilized. A plurality of circumferentially spaced axial bores 52 are formed in the front plate so that a corresponding plurality of threaded bolts 54 may be inserted therethrough for screw threaded engagement with the threaded bores 34 of the weight 32. In this way the resilient ring arrangement is axially secured to the weight, and is also disposed so that a radially inner portion 56 of the front plate entraps the outer race 38 of the roller bearing 40 in the counterbore 36. In a like manner, the rear plate 46 of the resilient ring arrangement is provided with a plurality of peripherally spaced, axially oriented threaded bores 58 therethrough so that a radially extending drive flange 60 may be removably secured thereto. For this purpose a plurality of threaded bolts 62 are inserted axially through a corresponding plurality of bores 64 in the drive flange for screw threaded engagement with the threaded bores of the rear plate.

The drive flange 60 is advantageously mounted on the distal end 30 of the elongated drive shaft 18 and includes a front hub portion 66 and a rear hub portion 68 having a common internally threaded bore 70 therethrough. It further includes a plug-receiving bore 72 radially through a portion of the rear hub, and a diametrically opposite observation bore 74 of a somewhat smaller diameter aligned therewith. Since the distal end of the drive shaft includes external threads 76 thereon, it is apparent that the drive flange may be screw threadably mounted for forward axial movement thereon. As the drive flange is screw threadably installed, the resilient ring arrangement 44 and weight 32 move with it as a unitary assembly so that the resilient ring arrangement urges the roller bearing 40 forwardly until it is seated on the stepped portion 42 of the shaft. In this way rightward installation of the drive flange when viewing FIG. 3 causes static compression of the elastomeric ring 48. In order to complete the positioning of the drive flange on the shaft, it is rotated thereon until an observation bore 78 and counterbore 80 provided in the rearward extremity of the shaft are visually aligned with the bores 74 and 72, respectively. Any small angular misalignment between the drive flange and shaft becomes readily apparent with such visual alignment, and upon the subsequent fine screw threaded adjustment thereof it is a relatively simple matter to radially insert a cylindrical plug or locking pin 82 in the bore 72 and counterbore 80 to secure the two members together. The plug is preferably of steel and is driven into the bores by a hammer or the like, where it is effectively and positively retained therein. At this point the elastomeric ring 48 is statically compressed to an axial length L, as shown on the drawing, corresponding to approximately 90 percent of its thickness when in its free, unloaded condition.

OPERATION

While the operation of the present invention is believed clearly apparent from the foregoing description, further amplification will subsequently be made in the following brief summary of such operation. As described, the drive line vibration absorber 10 of the present invention includes an inertia mass consisting of the annular weight 32, the front plate 50, the plurality of bolts 54, and the outer race 38 of the roller bearing 40 which is thereby axially and radially positioned on the shaft. Thus, this inertia mass is constrained by the roller bearing in all but the circumferential or torsional direction, and the relatively soft rubber ring 48 provides the sole axial driving cooperation between the inertia mass and the drive line. In this way the inertia mass is disposed in parallel to the mass elastic system 12, and the properly tuned rubber ring provides the relatively significant degree of damping necessary to effectively reduce the amplitude of the relatively low natural frequency torsional vibrations thereof.

Figure 4:
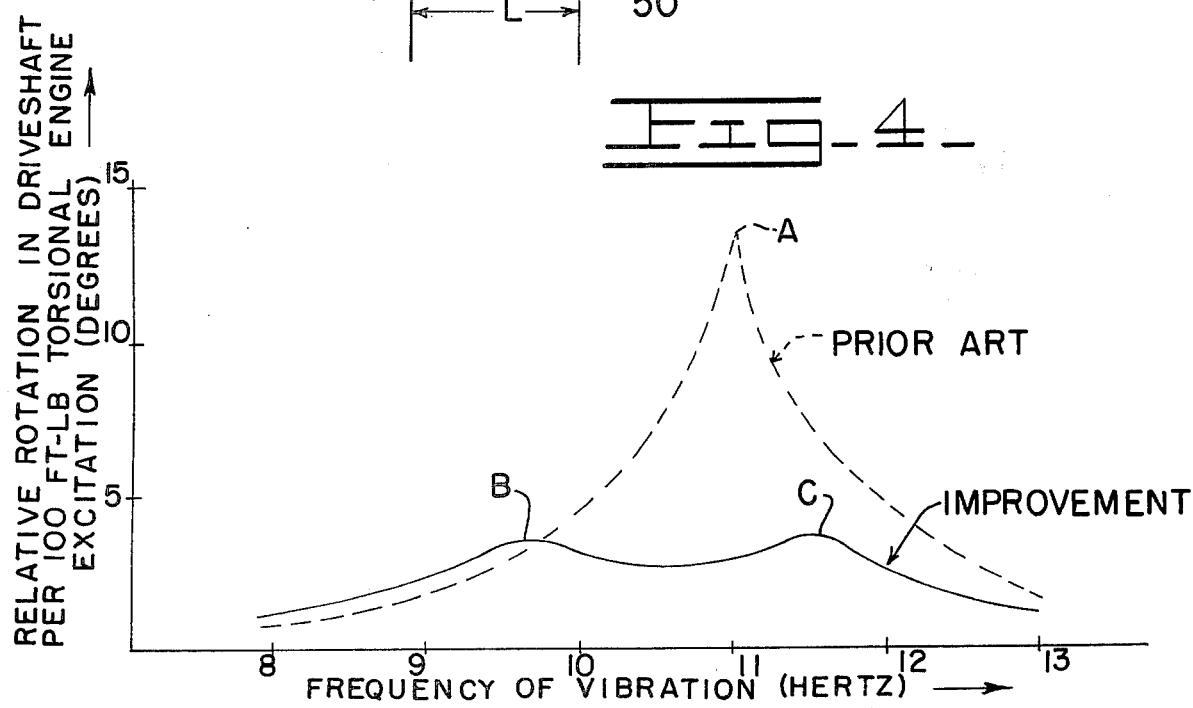
FIG. 4 is a graph showing the degrees of relative rotation of the drive shaft for a predetermined, torsionally excited engine torque versus frequency of vibration, and indicating the improvement of the drive line vibration absorber of the present invention over the prior art.

With reference to the graph of FIG. 4, the relatively high amplitude of the twist of the drive shaft 18 without the drive line vibration absorber 10 is shown in broken lines. From this graph it is noted that the characteristic prior art peak load designated by the reference letter A is observed at a relatively low frequency of approximately from 9 to 13 hertz corresponding to the third order of engine vibration. However, with the vibration absorber of the present invention added to the drive line 12, the marked improvement shown in solid lines is notably apparent. When tuning is present in a damper, the solid line amplitude versus frequency curve shows a characteristic double peak for each vibration mode, and such peaks are designated by the reference letters B and C in FIG. 4. Moreover, the graph indicates that the vibration absorber of the present invention significantly reduces the maximum levels of cyclic torsional vibration by approximately 70 percent.

Beneficially, the subject vibration absorber is tuned so soft that it is substantially isolated out of the system above a frequency range of approximately 20 hertz. Therefore, the subject vibration absorber is substantially and desirably inactive in the higher primary operating range of the engine.

ALTERNATE EMBODIMENT

Figure 5:
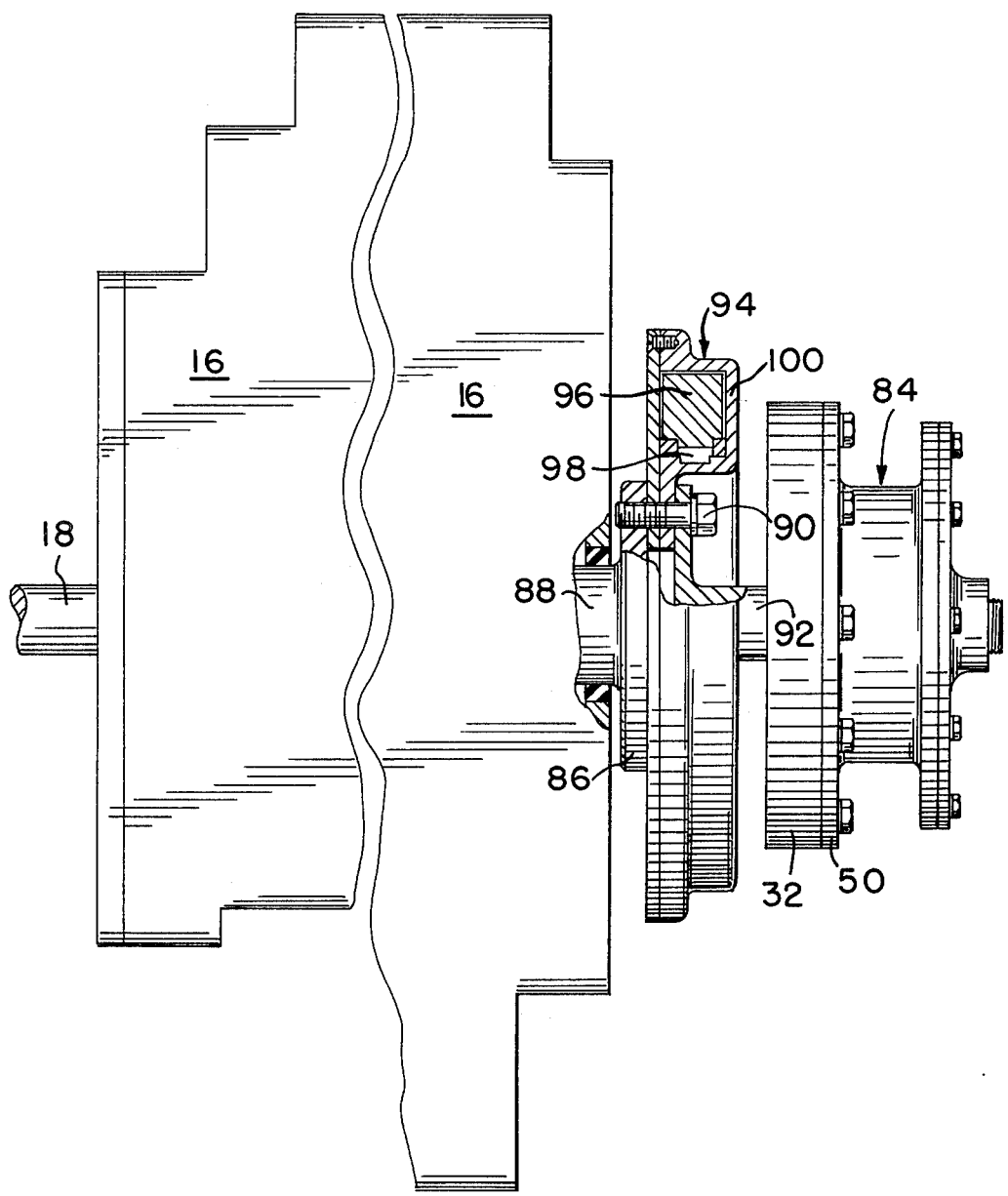
FIG. 5 is a fragmentary side elevational view of an alternate embodiment location of the vibration absorber of the present invention on the front end of an engine, and also showing a viscous coupling in juxtaposed relation therewith.

It is contemplated that the drive line vibration absorber 10 may be secured to the mass elastic system 12 at various locations while still reducing the amplitude of the relatively low natural frequency torsional vibrations present therein. By way of example, reference is made to FIG. 5 which shows that an alternate embodiment drive line vibration absorber 84 may be removably secured to a front flange 86 of an engine crankshaft 88 extending forwardly of the elongated drive shaft 18. For this purpose, a plurality of fastening bolts 90 are positioned axially through a stub shaft and flange arrangement 92 of the alternate embodiment vibration absorber for screw threaded receipt in the front flange 86. In this way the vibration absorber 84, like the vibration absorber 10 of FIG. 3, has its inertia mass consisting generally of the weight 32 and the plate 50 mounted disposed in cooperatively operating parallel relation to the mass elastic system on the front thereof.

These same fastening bolts may be used to removably secure a viscous engine torsional vibration damper, such as generally indicated by the reference numeral 94, to the crankshaft. Such viscous engine torsional vibration damper includes an inertia mass or annular inertial weight 96 disposed relatively closely, but with controlled clearance, within a cavity 98 defined by a housing 100. A viscous fluid having a predetermined viscosity is supplied to the cavity, for acting as a resilient tuning and viscous damping medium between the weight and housing. Such viscous torsional vibration damper is discussed in detail in U.S. Pat. No. 3,234,817 and is operationally effective for damping relatively high natural frequency torsional vibrations as previously set forth in the background of the invention.

On the other hand, the alternate drive line vibration absorber 84 independently controls the amplitude of relatively low natural frequency vibrations which are in the general order of one magnitude, or one tenth, lower than the relatively high natural frequency range noted immediately above. Thus, the drive line vibration absorber 84 and the engine torsional vibration damper 94 are independently operationally effective in their respective frequency ranges, and are individually substantially ineffective when outside their respective frequency ranges. Accordingly, pursuant to the present invention, the drive line vibration absorber 84 is capable of substantially isolated operation within the relatively high natural frequency range without in any way detrimentally influencing the operation of the engine torsional vibration damper 94.

In view of the foregoing, it is readily apparent that the vibration absorber 10 of the present invention markedly reduces the drive line torsional vibrations associated with a mass elastic system 12 having a relatively low natural frequency. It is also evident that this invention is of simple and economical construction and may be used in combination with other dampers. Still further, it is relatively easy to install as a unitary assembly and to establish the desirable 5 to 20 percent static axial compressive preload of the rubber ring 48 which substantially extends the service life thereof.

While the invention has been described and shown with particular reference to a preferred embodiment, it will be apparent that variations might be possible that would fall within the scope of the present invention, which is not intended to be limited except as defined in the following claims.

What is claimed is:

1. A drive line vibration absorber, for a mass elastic system having a relatively low natural frequency including an engine operatively connected to a transmission through an elongated drive shaft, comprising;
    an inertia mass radially supported for relatively free rotation on such drive shaft; and
    elastomeric ring means secured in axially driving cooperation intermediate said drive shaft and said inertia mass for permitting a relatively soft torsional movement thereof in tuned relation to the mass elastic system and effectively reducing the amplitude of torsional vibration levels therein.

2. The drive line vibration absorber of claim 1 wherein said elastomeric ring means is an annular rubber ring which is statically subjected to axial compression for improved service life thereof.

3. The drive line vibration absorber of claim 1 including bearing means removably secured to said shaft for axially locating and relatively freely rotationally supporting said inertia mass thereon.

4. The drive line vibration absorber of claim 3 wherein said elongated drive shaft includes a distal end for serviceably receiving said bearing means, said inertia mass and said elastomeric ring means thereon.

5. A drive line vibration absorber for a vehicle mass elastic system having a relatively low natural frequency of below approximately 30 hertz and including an engine disposed in a drivingly connected relation to a transmission through an elongated drive shaft, comprising;
    an inertia mass relatively freely rotationally supported on such drive shaft in an axially located disposition at a distal end of such drive shaft;
    a drive flange removably secured to said distal end of said drive shaft; and
    elastomeric ring means extending axially intermediate said drive flange and said inertia mass for solely torsionally driving it at a relatively low effective stiffness and thereby substantially reducing the amplitude of the torsional vibration levels emanating from the engine.

6. The drive line vibration absorber of claim 5 wherein said distal end of said drive shaft is provided with screw threads, and said drive flange is screw threadably installed thereon for establishing a predetermined axial distance between said flange and said inertia mass and thereby a predetermined axial compressive preload of said elastomeric ring means.

7. The drive line vibration absorber of claim 6 wherein said elastomeric ring means includes an annular rubber ring which is statically axially compressed within the range of from 5 to 20 percent to extend the service life thereof.

8. A vibration absorber arrangement, for a mass elastic system including an engine having a crankshaft, and an elongated drive shaft extending from the crankshaft for operative driving cooperation with a gear train, comprising;
    an inertia mass mountably disposed in parallel cooperating relation on such crankshaft;
    drive means disposed intermediate said crankshaft and said inertia mass and permitting controlled torsional movement thereof for effective engine vibration damping of a relatively high natural frequency vibration;
    an independent inertia mass mountably disposed in parallel cooperating relation on such mass elastic system in spaced relation from said inertia mass; and
    resilient means secured to said mass elastic system in driving cooperation with said independent inertia mass and permitting limited torsional movement thereof for effectively reducing the amplitude of a relatively low natural frequency vibration of said mass elastic system and being substantially operationally isolated therefrom when exposed to vibration outside said relatively low natural frequency to assure no adverse effect on said inertia mass and said drive means.

9. A drive line vibration absorber, capable of being mounted on a shaft of a mass elastic system, comprising:
   a roller bearing mounted on said shaft;
   an inertia mass rotatably supported and positively axially located on said roller bearing;
   a drive member mounted on said shaft in axially facing relation to said inertia mass and at a predetermined axial distance therefrom; and
   an elastomeric ring axially secured at said axial distance between said inertia mass and said drive member, and subjected to a compressive preload for torsionally driving said inertia mass and reducing the amplitude of torsional vibrations of the mass elastic system.

10. The drive line vibration absorber of claim 9 wherein said elastomeric ring is statically axially compressed within the range of from 5 to 20 percent from its unloaded condition.

11. The drive line vibration absorber of claim 9 wherein said drive member is axially screw threadably installed on said shaft for establishing said predetermined axial distance.

\* \* \* \* \*